Dec. 1, 1953  V. D. ROOSA  2,660,992
AUTOMATIC TIMING MEANS FOR FUEL PUMPS
Filed Feb. 3, 1950  2 Sheets-Sheet 1

Inventor
VERNON D. ROOSA

By Lindsey, Brutzman + Just
Attorneys

Dec. 1, 1953 V. D. ROOSA 2,660,992
AUTOMATIC TIMING MEANS FOR FUEL PUMPS
Filed Feb. 3, 1950 2 Sheets-Sheet 2

Inventor
VERNON D. ROOSA

By Lindsey, Prutzman & Just
Attorneys

Patented Dec. 1, 1953

2,660,992

UNITED STATES PATENT OFFICE 2,660,992

AUTOMATIC TIMING MEANS FOR FUEL PUMPS

Vernon D. Roosa, West Hartford, Conn.

Application February 3, 1950, Serial No. 142,276

16 Claims. (Cl. 123—139)

The present invention relates to fuel pumps of the type utilized with internal combustion engines and, more particularly, to means for automatically varying the timing of the pump in response to engine operating conditions. The device of the present application is an improvement over that disclosed and claimed in my copending application Serial No. 767,939, filed August 11, 1947.

In general, engine fuel pumps of the character referred to here are constructed and arranged to deliver metered charges of liquid fuel under high pressure to the engine cylinders in timed relationship. The present invention particularly pertains to fuel pumps of this type wherein one or more piston pumps are moved bodily relative to a cam of the fixed type by a drive from the engine and wherein the cam has a configuration such that this relative movement produces the desired timed pumping action.

In order to increase the efficiency and smoothness of operation of the engine, it has been found desirable to advance the timing of the pump relative to the engine when the engine is operated at increased speeds. In other words, it is desirable to cause the period of fuel injection to take place at increased engine speeds slightly in advance of the time when injection takes place at low engine speed. In fuel pumps of the type referred to here, this may be accomplished by adjusting the position of the cam in response to engine speed so that the periods of pumping action will be advanced in a timing sense relative to the operation of the engine as engine speed increases.

A principal aim of the invention is to provide an automatic timing advance for fuel pumps of the type referred to which will be efficient and sensitive in operation so as to provide the desired correlation between engine speeds and fuel injections under all conditions of operation.

A further aim is to provide such a device having the desired sensitivity and efficiency of operation but which will not be subject to "fluttering" and "chattering" as a result of any rapid or frequent changes in engine speeds which might occur.

A further aim is to provide such a device which can withstand the high pressures or other forces normally encountered in regulation of this type without danger of failure and which will operate without any binding or locking of the moving parts which might result from operation under such high pressures, etc.

Another aim is to provide a device of this type which is of relatively small size and compact and efficient in design so that it can be attached to or mounted in a fuel pump and connected for operation in a minimum of space and which will present no difficulties in respect to the supporting and mounting of same.

Another aim is to provide a device of this type which is simple and economical to fabricate and assemble, which will function efficiently over long periods of time without the need for frequent repair and replacement, and which can be adjusted and repaired, if necessary, with a minimum of effort and skill.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
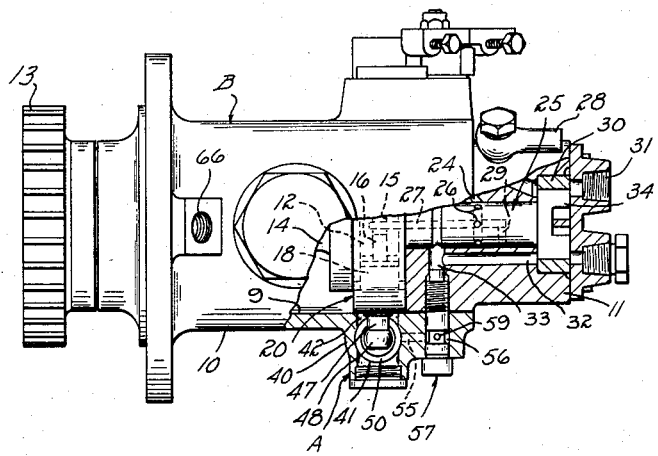
Figure 1 is a side view of a fuel pump in which the device of the present invention has been embodied, the pump being turned to show the device in end view with its housing and a portion of the pump housing cut away to show certain of the operating parts.

Referring to the drawings, the device of the present invention denoted generally at A is shown for purposes of illustration as "built in" a fuel pump mechanism generally denoted by reference letter B, the fuel pump being of the type disclosed and claimed in my copending application previously referred to. As will be apparent from the following description, the device of the present invention, if desired, could take the form of a separate instrumentality for attachment to a fuel pump and could be applied to fuel pumps of differing construction. Inasmuch as details of construction of the fuel pump itself form no part of the present invention, the description herein will be limited only to those portions as will be required for a proper understanding of the present invention.

Figure 2:
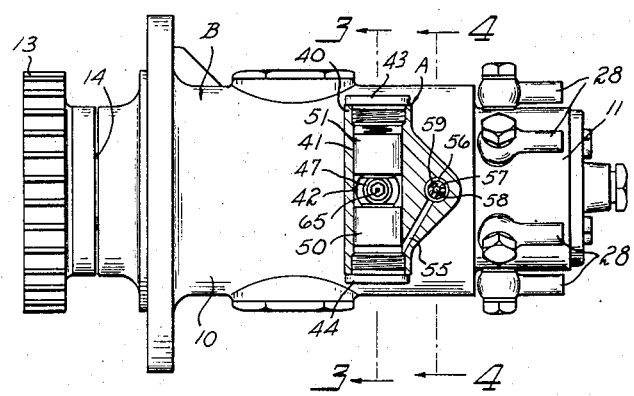
Fig. 2 is a side view of the fuel pump turned 90° to present a front view of the device of the present invention, the housing of the device being cut away to show the operating parts.

Referring to Figs. 1 and 2 of the drawings, the fuel pump B with which the device of the present invention is utilized for illustrative purposes, includes a main housing 10 having a bore 9 into one end of which is telescopically fitted an end housing 11. Mounted within bore 9 of the main housing 10 adjacent the end housing 11 is a rotary member 12 which is adapted to be rotated by the engine (not shown) with which the fuel pump is employed. For illustrative purposes, a shaft 14 and gear 13 are shown for connection to an engine driven shaft for driving the rotary member 12.

The rotary member 12 is formed with a transverse bore 15 in which are slidably mounted a pair of opposed plungers 16. The outer ends of the plungers 16 engage against shoes 17 which are slidable in counterbores 19 and in which are mounted rollers 18. Surrounding the rotary member 12 is a generally circular or ring-like cam 20 which is formed with a plurality of lobes 21 (high portions) spaced around its inner periphery. As will be apparent, when the rotary member 12 is rotated relative to the ring-like cam 20, the rollers 18 will alternately engage against the lobes 21 to drive the plungers 16 inwardly following which the rollers will be moved adjacent the low spaces between the lobes 21 permitting the plungers 16 to separate. The alternate compression and separation of the plungers 16 is utilized to carry out the pumping or injection of fuel to the engine cylinders. The number of lobes 21 will be equal to the number of the cylinders of the engine with which the fuel pump is used.

Figure 3:
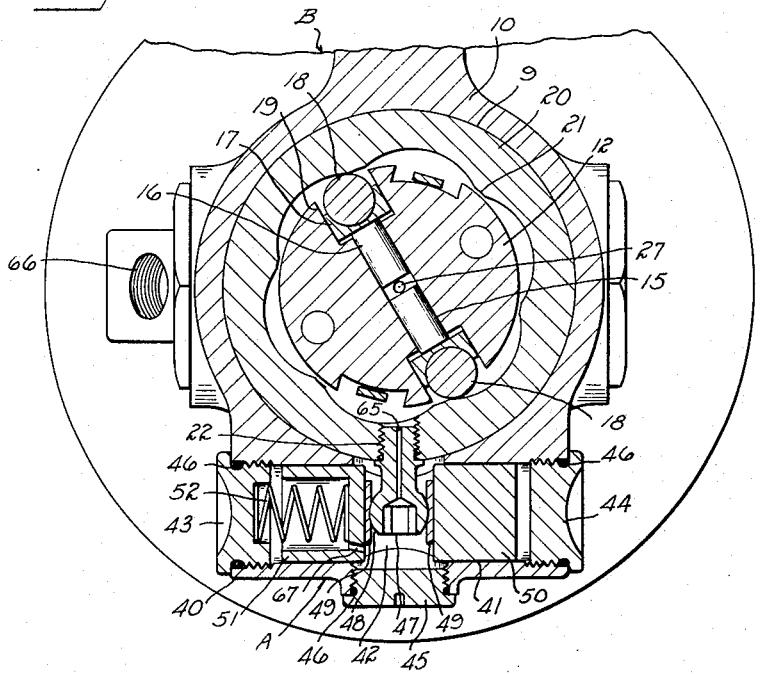
Fig. 3 is a cross sectional view taken along the line 3—3 of Fig. 2.
Figure 4:
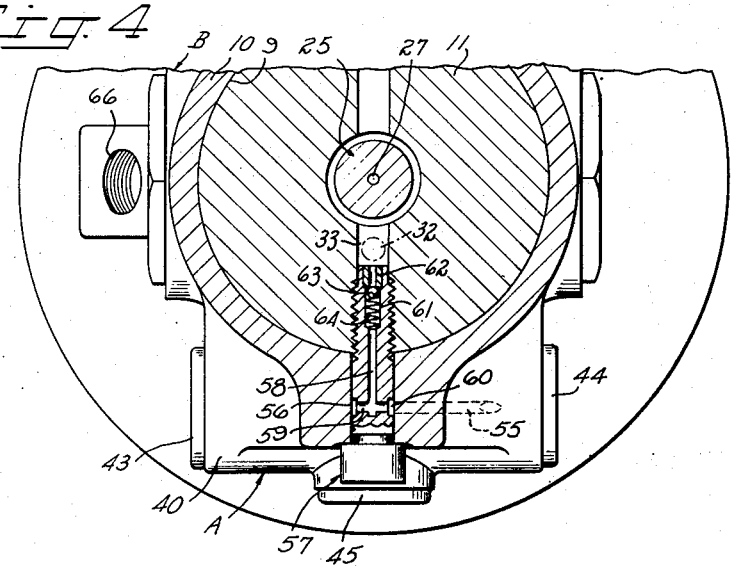
Fig. 4 is a cross sectional view taken along the line 4—4 of Fig. 2.

Formed integrally with the rotary member 12 and extending into the end housing 11 is a fuel receiving and distributing member 25 having an axial passageway 27 communicating with the bore 15 of the rotary member 12, as best shown in Fig. 3 of the drawings. The axial passageway 27 of the fuel receiving and distributing member 25 is formed with a port 29 constructed to sequentially connect the bore 27 with passageways (not shown) going, respectively, to the fuel outlets 28, the fuel outlets 28 being adapted to be connected to the injectors of the cylinders of the engine in the usual manner. Bore 27 is also provided with a plurality of ports 26 (shown 3) for connecting the same alternately with a fuel inlet passageway 24 in the end housing 11. The arrangement is such that fuel is admitted to the bore 15 through one of the ports 26 and axial passageway 27 while the plungers are moved past the low portions of the cam with the result that a fuel charge is received between the plungers 16, the plungers being separated by the pressure of the incoming fuel and also by centrifugal force. Then, as the plungers move to the high portions of the cam, the ports 26 move out of registry with fuel inlet 24 and port 29 moves into registry with one of the fuel outlets. The high portions of the cam, of course, force the plungers together causing ejection of the fuel charge therebetween. In this manner, fuel is transferred from the inlet to the engine cylinders at high pressure and in metered amounts and in timed relationship. In general, the time interval required for the plungers 16 to be forced together and thus produce a pumping action is materially less than the time interval during which the port 29 is in communication with one of the fuel outlets 28. Accordingly, it is possible to vary the timing of the pumping action by advancing or delaying the movement of plungers 16 without at the same time varying the timing of the distributing member 25.

Fuel is supplied to the fuel inlet passageway 24 and thence to the fuel receiving and distributing member 25 by a suitable pick-up or feed pump 30, the moving parts of which are connected to the outer end of the fuel receiving and distributing member 25 for rotation therewith. In the illustration in the drawings, the pick-up or feed pump 30 is a conventional sliding vane type pump having a rotary member 34, although other types of pumps such as a gear pump would serve equally well. The inlet side of the pick-up or feed pump 30 is adapted to be connected through an inlet 31 to a fuel reservoir such as a conventional fuel tank (not shown). The outlet side of the pick-up or feed pump 30 communicates with a longitudinal passageway 32 and a transverse passageway 33 in the end housing 11.

As previously mentioned, the foregoing details of construction of the fuel pump are described here merely to provide the necessary setting for the present invention and these details do not of themselves form a part of the present invention, but are disclosed and claimed in my copending application previously identified.

The ring-like cam 20 and main housing 10 are so formed that the cam 20 can be rotated relative to the housing 10 for adjustment purposes. Referring to Fig. 3 of the drawings and assuming that the rotary member 12 is being rotated in a counterclockwise direction during normal operation, it will be apparent that, by adjusting the position of the ring-like cam 20 in a clockwise direction, the periods of fuel injection will take place at an earlier time relative to the rotated position of the rotary member 12 and, if the cam 20 is adjusted in a counterclockwise direction, the period of fuel injection will occur later. The device of the present invention is intended to accomplish this advancing and retarding of the cam automatically in response to the engine speed.

As shown in the drawings, the main housing 10 is provided with an enlarged portion or boss 40 having a bore 41 generally tangential to the cam 20 and a bore 42 extending generally radially of the pump and communicating with the bore 41 and with the interior of the housing 10. These bores 41 and 42 are in substantially the same plane as the ring-like cam 20. The bores are closed at their outer ends by suitable plugs 43, 44 and 45, a liquid-proof closure being insured by the use of suitable packing material 46.

The cam 20 is provided with a tapped hole 22 into which is threadably engaged a cam actuating arm 47. The width of the arm 47 and bore 42 are such as to provide a clearance therebetween which permits the rotated position of the cam 20 to be adjusted over a sufficiently wide range (approximately 6½°) by moving the arm 47 to provide the desired variance in timing of the fuel pump.

The means utilized in accordance with the invention for positioning the actuating arm 47 comprises a cylindrical floating piston 50 slidably received in the bore 41 and positioned on one side of the actuating arm 47 and a cup-shaped plunger 51 also slidably received in the bore 41 and disposed at the opposite side of the actuating arm 47. The cylindrical piston 50 is intended to be moved by fluid pressure to move the actuating arm 47 so as to advance the cam 20 while the plunger 51 moves the actuating arm 47 to move the cam 20 to retard position by reason of the spring 52. In order to facilitate the operation of the actuating arm 47 by the piston 50 and plunger 51, the arm 47 is provided with a bulbous head 48 and the piston 50 and plunger 51 are provided with end disks 49 having a concave bearing surface for engaging the head 48 of the arm 47.

A passageway 55 is bored through the boss 48 between the end of the bore 41 on the side having the cylindrical piston 50 and a bore 56 communicating with the transverse bore 33 previously mentioned as being in communication with the outlet side of feed pump 30. Threadably received in the bore 56 is a valve stem 57 which is formed with a central passageway 58 and transverse ports 59 communicating with an annular recess 60 disposed adjacent the opening of the passageway 55. The inner end of the valve stem 57 contains a counterbore 61 in which is inserted a bushing 62 providing a restricted opening and a seat for a ball 63 urged into seating position by a spring 64. In effect, the valve stem 57 provides a restricted opening and one-way valve between the outlet side of the pick-up or feed pump 30 and the bore 41.

As will be apparent, the pressure of the fuel in the bore 32 will be responsive to engine speed inasmuch as the pick-up or feed pump 30 is driven by connection to the engine drive shaft. This pressure in one specific embodiment of a pump of this type will vary, for example, from about 20 lbs. per square inch at an engine speed of 300 R. P. M. to about 80 lbs. per square inch at an engine speed of 2000 R. P. M. This fluid pressure being transmitted to the outer end of the piston 50 causes the cam to be advanced in response to engine speed against the spring loaded piston 51. As a result of the small distance between the outlet of the pick-up pump 30 and the bore 41 and the use of interior passageways throughout, the pressure in the bore 41 remains closely responsive to engine speeds and there is no material loss due to conduit pulsation or expansion.

As will be apparent, there will be a thrust on the cam 20 each time that the rollers 18 engage one of the lobes 21, which force will be applied through the actuating arm 47 to the piston 50. However, this force will be absorbed without any appreciable shifting of the cam because the ball valve 63 will prevent the escape of the fluid from the bore 41 and the fluid is not compressible. As a result of this construction, the piston 50 can be mounted for movement tangential to the cam 20 as shown, which is advantageous from a mechanical standpoint, without at the same time permitting the cam to oscillate due to the uneven thrust thereon.

Assuming, after the engine has been speeded up and the fluid pressure applied to the piston 50 is sufficient to advance the cam 29 against spring loaded piston 51, that the engine speed decreases, it is desired to have the cam 20 move to a retarded position, this by action of spring loaded piston 51. This retarding of the cam 20 is permitted by leakage of fuel along the periphery of the piston 50. The piston 50 is preferably formed with a predetermined small clearance with respect to the bore 41 of approximately .002 inch, for example, which will permit sufficient seepage of the fluid around the piston 50 to permit dampened movement of the cam to retard position when engine speed decreases. Retarding movement of the cam is halted, however, when the fluid pressure on piston 50 is sufficiently lowered by seepage to permit the valve ball 63 to unseat, the cam 20 being then positioned responsive to the output of feed pump 30 and hence the prevailing engine speed. Because the retarding movement of the cam 20 is dampened, as aforesaid, no abrupt movement or "fluttering" of the cam will take place even though rapid changes in engine speed may take place.

The fluid which seeps past the piston 50 is allowed to flow through a central bore 65 in the actuating arm 47 to the interior of the housing 10. In normal operation of the pump and the cam advancing means, the bore 41 and the housing 10 are filled with oil, the excess being permitted to return to the fuel tank by suitable connections (not shown) to the threaded opening 66. An opening 67 in the cup-shaped plunger 51 prevents interference with the action of the plunger 51 by the presence of oil behind the plunger.

It will be noted that, in the event that the pump is driven in the reverse direction, it is necessary merely to reverse the positions of the piston 50 and plunger 51 and to direct the passageway 55 to the opposite end of the bore 41. Also, if desired, the device of the present invention may be housed in a separate non-integral casing which can be removably attached to the pump housing.

It thus will be seen that a device has been provided in accordance with the invention which insures an adequate force for regulating the position of the cam 20 and which is responsive to the speed of the engine. The device is sensitive to engine speeds and yet, at the same time, permits sudden changes in engine speeds without causing violent actuating of the cam 20. The device is of simple construction and will function efficiently over long periods of time without failure.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A device for use with a fuel pump of the type having a stationary cam to vary the position of the fuel pump cam responsive to the speed of an associated engine comprising means forming a pressure chamber, a movable member for attachment to the cam extending into the chamber, a free piston in the chamber for actuating the movable member in a cam advancing direction, spring operated means biasing the member in a cam retarding direction, means forming an inlet to the chamber for receiving fluid under pressure, and a feed pump driven by the engine in fluid communication with the said inlet.

2. A device for use with a fuel pump of the type having a stationary cam to vary the position of the fuel pump cam in response to variation in fluid pressure comprising means forming a pressure chamber, a piston in said chamber, means operatively connecting said piston with the cam for movement thereof in one direction in response to increase of fluid pressure within said chamber, spring operated means spaced from said piston operatively connected with the cam for movement thereof in another direction in response to decrease of fluid pressure within said chamber, and means for introducing fluid under pressure to the chamber responsive to engine speed including a feed pump driven by the engine.

3. In a fuel pump of the type having a normally stationary cam, a device for changing the position of the fuel pump cam in response to variation in fluid pressure comprising means forming a pressure chamber, a piston in said chamber and movable in the same general direction as said cam, means operatively connecting said piston with the cam for movement thereof in one direction in response to increase of fluid pressure within said chamber, and means independent of said piston and spaced therefrom operatively connected with the cam for movement thereof in another direction upon decrease of fluid pressure within said chamber.

4. A device for rotatably adjusting the position of a fuel pump cam responsive to the speed of an associated engine comprising means forming a chamber extending generally tangentially to the cam, a movable member for attachment to the cam extending into the chamber, a piston in the chamber for actuating the movable member in a cam advancing direction, means biasing the member in a cam retarding direction, a source of fluid under pressure responsive to engine speed including a fluid pump driven by the engine and a passageway between the fluid pump and chamber for introducing fluid to the chamber under pressure responsive to engine speed including a one-way valve.

5. In a fuel pump of the type having a normally stationary cam, a device for rotatably adjusting the position of a fuel pump cam responsive to the speed of an associated engine comprising means forming a pressure chamber, a movable member for attachment to the cam extending into the chamber, a piston in the chamber for actuating the movable member in a cam advancing direction, means biasing the member in a cam retarding direction, means for introducing fluid to the chamber under pressure responsive to engine speed including a feed pump and a passageway between the feed pump and chamber having a one-way valve, and means forming a restricted release passageway from the chamber for said fluid.

6. A device for adjusting the position of a fuel pump cam responsive to the speed of an associated engine comprising means forming a pressure chamber, a movable member for attachment to the cam extending into the chamber, a floating piston in the chamber engaging the member and arranged to move the member in a cam advancing direction when fluid under pressure is introduced into the adjacent end of the pressure chamber, said piston and chamber being formed with a clearance to permit restricted leakage of fluid past the piston, and means including a passageway connected to the chamber for introducing fluid to said adjacent end of the pressure chamber at a pressure responsive to engine speed, and a one-way valve in said passageway blocking reverse movement of the fluid in said passageway.

7. A device for adjusting the position of a fuel pump cam responsive to the speed of an associated engine comprising means forming a pressure chamber, a movable member for attachment to the cam extending into the chamber, a floating piston in the chamber engaging the member and arranged to move the member in a cam advancing direction when fluid under pressure is introduced into the adjacent end of the pressure chamber, means biasing the member in a cam retarding direction, a fuel injection pump, a feed pump operable by an associated engine to supply fluid to the fuel injection pump at a pressure responsive to engine speeds, means forming a one-way fluid connection between the feed pump and said adjacent end of the pressure chamber, and means forming a restricted release passageway for said fluid.

8. In a fuel pump having a cam of the normally stationary type which is rotatably adjustable to vary the timing of the pump, means for adjusting the position of the cam responsive to engine speed comprising means forming a chamber extending generally tangentially to the cam, an actuating arm attached to the cam and extending into the chamber, a floating piston in the chamber on one side of the arm, a spring pressed plunger in the chamber engaging the opposite side of the arm, means for introducing liquid under pressure into the end of the chamber adjacent the floating piston, and means forming a constant restricted release passageway for said fluid.

9. In a fuel pump having a cam which is movable to vary the timing of the pump, means for adjusting the position of the cam responsive to engine speed comprising means forming a chamber extending generally tangentially to the cam, an actuating arm attached at one end to the cam and having its other end extending radially into the chamber intermediate the ends thereof, a free piston in the chamber on one side of the arm for moving the arm in a cam advancing direction, a source of fluid under pressure responsive to engine speed including a fluid pump driven by the engine, means for introducing fluid into the end of the chamber adjacent the free piston at a pressure responsive to engine speeds including a passageway between said source and the chamber having a one-way valve, means biasing the arm in a cam retarding direction, and means forming a restricted release passageway for the fluid.

10. In a fuel pump having a cam which is movable to vary the timing of the pump, means for adjusting the position of the cam responsive to the speed of an associated engine comprising means forming a cylindrical chamber extending generally tangentially to the cam, an actuating arm attached at one end to the cam and having its other end extending laterally into the chamber through an opening in the side thereof, a free piston in the chamber on one side of the arm for moving the arm in a cam advancing direction, a source of fluid under pressure responsive to engine speed including a fluid pump driven by the engine, means for introducing fluid into the end of the chamber adjacent the free piston at a pressure responsive to engine speed including a passageway between said source and the chamber having a one-way valve, means forming a fluid release passageway spaced from the end of the chamber adjacent the piston, said piston and chamber being formed to permit a limited flow of fluid past the piston, and means biasing the arm in a cam retarding direction.

11. In a fuel pump having a cam which is movable to vary the timing of the pump, means for adjusting the position of the cam responsive to the speed of an associated engine comprising means forming a cylindrical chamber extending generally tangentially to the cam, an actuating arm attached at one end to the cam and having its other end extending radially into the chamber intermediate the ends thereof, a spring pressed plunger in one end of the chamber engaging one side of the arm for urging the arm in a cam retarding direction, a free piston in the other end of the chamber engaging the opposite side of the arm, means for introducing fluid to the said one end of the chamber including a pump driven by the engine and a one-way valve between the chamber and the pump, and means forming a fluid release passageway intermediate the ends of the chamber, said piston and chamber being formed with a small clearance to permit seepage of fluid past the piston.

12. A mechanism as set forth in claim 9 in which the means forming a fluid release passageway intermediate the ends of the chamber includes a passageway extending in an axial direction through the cam actuating arm.

13. In a fuel pump having a cam which is movable to vary the timing of the pump, means for adjusting the position of the cam responsive to the speed of an associated engine comprising means forming a cylindrical chamber, an actuating arm for the cam extending into the chamber, a free piston in the chamber engaging the arm for moving the arm in a cam advancing direction, means biasing the cam in a cam retarding direction, a feed pump driven by the associated engine, means forming a fluid passageway between the feed pump and the chamber, a one-way valve in said passageway, and means forming a normally open restricted release passageway for the fluid in said chamber.

14. In a fuel injection system for internal combustion engines and the like of the type comprising a feed pump operable by the engine to supply fuel at a pressure responsive to engine speeds, rotatable fuel distributing means operable by the engine to distribute fuel to the engine cylinders in timed relationship, pumping means in communication with said distributing means and rotated by the engine, and a stationary cam for actuating the pumping means as the latter is rotated, the combination therewith of means for adjusting the position of the cam responsive to engine speed comprising pressure actuatable means connected to the cam, means forming a fluid communication between the feed pump and the last-named means including a one-way valve, and means for permitting a slow release of fluid from the pressure actuatable means.

15. In a fuel injection system for internal combustion engines and the like of the type comprising a feed pump operable by the engine to supply fuel at a pressure responsive to engine speed, rotatable fuel distributing means operable by the engine to distribute fuel to the engine cylinders in timed relationship, pumping means in communication with the distributing means and rotated by the engine, and a stationary cam for actuating the pumping means as the latter is rotated, the combination therewith of means for adjusting the position of the cam responsive to engine speed comprising means forming a pressure chamber, a positioning arm for the cam extending into the chamber, means biasing the arm in a cam retarding direction, a free piston in the chamber engaging the arm for moving the arm in a cam advancing direction, means forming a fluid passageway between the chamber and the feed pump, a one-way valve in said passageway for preventing flow of fluid from the chamber to the feed pump, and means forming a restricted fluid release passageway to the chamber.

16. In a fuel pump of the type comprising a casing, a rotatable fuel distributing means in said casing, pumping means carried by said distributing means and rotated simultaneously therewith, a stationary cam adjustably mounted in the casing adapted to actuate the fuel pumping means as the latter is rotated relative thereto, and a feed pump having a rotary member connected to the distributing means, the combination therewith of means forming a bore in said casing generally tangential to the cam, means forming a fluid passageway between one end of the bore and the feed pump, a one-way valve in said passageway, an arm attached to the cam extending radially into the bore, a free piston in the bore between the arm and the fluid passageway, said piston and bore being formed to permit a restricted escape of fluid past the piston, spring means urging the arm in a cam retarding direction, and means forming a fluid passageway from the bore to the interior of the casing.

VERNON D. ROOSA.

References Cited in the file of this patent

UNITED STATES PATENTS

| Number | Name | Date |
|---|---|---|
| 2,177,120 | Schaeren | Oct. 24, 1939 |
| 2,253,454 | Voit | Aug. 19, 1941 |
| 2,305,308 | Fischlmayr | Dec. 15, 1942 |
| 2,395,964 | Fodor | Mar. 5, 1946 |
| 2,462,500 | Hoffer | Feb. 22, 1949 |